US008392092B2

(12) United States Patent
Fojtik et al.

(10) Patent No.: US 8,392,092 B2
(45) Date of Patent: Mar. 5, 2013

(54) SYSTEM FOR RUNNING AN INTERNAL COMBUSTION ENGINE

(75) Inventors: Marek Fojtik, München (DE); Olaf Graupner, Köfering (DE); Richard Kopold, Donaustauf (DE); Michael Nienhoff, Regensburg (DE); Diego Valero-Bertrand, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 583 days.

(21) Appl. No.: 12/663,958

(22) PCT Filed: Jun. 13, 2008

(86) PCT No.: PCT/EP2008/057472
§ 371 (c)(1),
(2), (4) Date: May 13, 2010

(87) PCT Pub. No.: WO2008/152129
PCT Pub. Date: Dec. 18, 2008

(65) Prior Publication Data

US 2010/0256889 A1 Oct. 7, 2010

(30) Foreign Application Priority Data

Jun. 14, 2007 (EP) .................................... 07011713

(51) Int. Cl.
*F02D 28/00* (2006.01)
*G06F 17/00* (2006.01)

(52) U.S. Cl. ....................................................... 701/102

(58) Field of Classification Search .................. 701/102, 701/110, 115
See application file for complete search history.

(56) References Cited

U.S. PATENT DOCUMENTS 6,178,945 B1 * 1/2001 Suzuki et al. ................. 123/295
6,497,212 B2 * 12/2002 Matsumoto et al. .......... 123/295
6,584,952 B1 7/2003 Lagier ........................... 123/295
6,705,301 B2 * 3/2004 Dollmeyer et al. ...... 123/568.22
7,565,237 B2 * 7/2009 Wang ............................ 701/103
2003/0085577 A1 5/2003 Takaoka et al. ................. 290/40
2003/0098187 A1 5/2003 Phillips et al. ............... 180/65.3

FOREIGN PATENT DOCUMENTS

DE 10301608 7/2004
EP 1327759 7/2003

OTHER PUBLICATIONS

European Search Report and Written Opinion for Application No. 07011713.0 (5 pages), Nov. 7, 2007.
International Search Report and Written Opinion for Application No. PCT/EP2008/057472 (11 pages), Oct. 6, 2008.

* cited by examiner

*Primary Examiner* — Hieu T Vo
(74) *Attorney, Agent, or Firm* — King & Spalding L.L.P.

(57) ABSTRACT

A system for running an internal combustion engine has at least two mode managers for activating and/or for requesting at least one combustion mode of the internal combustion engine. The system further has a combustion manager (9) wherein each of the output of the mode managers (1-7) are attached at least at one input of the combustion manager (9) for collecting and prioritizing all combustion mode requests active at the same time.

16 Claims, 7 Drawing Sheets

SYSTEM FOR RUNNING AN INTERNAL COMBUSTION ENGINE

CROSS-REFERENCE TO RELATED APPLICATIONS

This application is a U.S. National Stage Application of International Application No. PCT/EP2008/057472 filed Jun. 13, 2008, which designates the United States of America, and claims priority to EP Application No. 07011713.0 filed Jun. 14, 2007, the contents of which are hereby incorporated by reference in their entirety.

TECHNICAL FIELD

The present invention describes a system for running an internal combustion engine and provides a corresponding method having at least two mode managers for activating and/or for requesting at least one combustion mode of the internal combustion engine.

BACKGROUND

To keep up to the strict upcoming requirements of the emission legislation the combustion engine needs to be continuously improved and at the same time must not compromise on the costs of the Engine Control Unit (ECU). The Engine Management System (EMS) is challenged with an increasing number of injections and combustion modes thereby increasing the cost and size of the ECU's memory and its computation time. A combustion mode can be described as a set of combustion parameters that can be controlled by the software. Typically for a DS EU 4 application the combustion parameters controlled by the software are: injected fuel mass, injection position, rail pressure, air mass flow, boot pressure and EGR rate. The EMS needs to manage more combustion parameters that requires to be tuned for every combustion mode. During the past years there was a dramatic increase in the number of engine management control modes that are applied in specific conditions. The best known example for this is the Diesel particle filter (DPF) strategy that activates the filter regeneration every few hundred kilometers.

An other disadvantage in an EMS with an increasing number of combustion modes is the fast-growing ROM consumption due to the high number of calibration maps. This happens because the calibration engineers need to calibrate all the combustion parameters at each working point for each combustion mode in order to reach the relevant target such as consumption, noise, emissions, etc.

Such a typical know EMS architecture is shown in FIG. 1. The increasing number of the combustion modes lead to the following problems. First of all only one combustion mode can be executed at a time. Therefore if two or more combustion modes are requested a decision needs to be taken. In order to solve conflict between combustion modes prioritization has been implemented at different levels in the software. Every time a new mode manager is introduced possibly all other mode managers such as DPF manager or RTE manager in FIG. 1 need to be modified thus causing unclear and spread decision algorithm for mode prioritization. Additionally the transition between the combustion modes has to be handled in a torque neutral way.

The simple approach of creating a calibration structure that allows the tuning of all combustion set-points and making a new copy of it for every new combustion mode is not feasible. The reason is that the required ROM resources for this would severely increase the ECU costs and in many cases it would force an upgrade to a better processor and additionally increasing costs.

SUMMARY

According to various embodiments, a system for running an internal combustion engine can be provided which finds the balance between increasing requirements and the limited ECU resources.

According to an embodiment, a system for running an internal combustion engine may have at least two mode managers for activating and/or for requesting at least one combustion mode of the internal combustion engine, and a combustion manager wherein each of the output of the mode managers are attached at least at one input of the combustion manager for collecting and prioritizing all combustion mode requests active at the same time.

According to a further embodiment, the combustion manager may comprise a combustion mode transition manager for performing a transition from the current combustion mode to a target combustion mode. According to a further embodiment, the target combustion mode may be dependent on the result of the prioritization of the active combustion mode requests. According to a further embodiment, the system further may comprise means for activating the combustion mode transition manager in case the current and the target combustion modes are different. According to a further embodiment, the combustion manager may comprise an interrupt unit for interrupting the running combustion mode transition manager in case a new combustion mode request has a higher priority than the target combustion mode and the combustion mode request is requesting a jump. According to a further embodiment, the combustion mode jump request may be a zero torque request or a sudden high torque request. According to a further embodiment, the combustion mode transition manager may comprise means for performing the transition from the current to the target combustion mode over a nominal mode. According to a further embodiment, the system may use a single scalable calibration structure, a flexible linking between the calibration tables, the combustion set points and the combustion modes.

BRIEF DESCRIPTION OF THE DRAWINGS

The invention will now be described with reference to the accompanying and schematic drawing wherein:

FIG. 3 depicts three graph with identical time scales, wherein

DETAILED DESCRIPTION

It has been found that in order to handle the increasing software complexity, the solution is to create a central functionality that takes care of the prioritization and coordination. The combustion manager acts as a bridge between all the software strategies that need to take over the control of the injection system and the strategies that manage the combustion parameter calculation.

It has been found that in order to handle the big memory requirement the solution is that the calibration tables are not assigned prior to a defined combustion mode and injection but give the flexibility to calibrate engineer to link the available tables or maps to a defined physical event such as first pilot injection in DPF regeneration mode. Thereby allowing the reuse of tables across injections or even across combustion modes.

Figure 1:
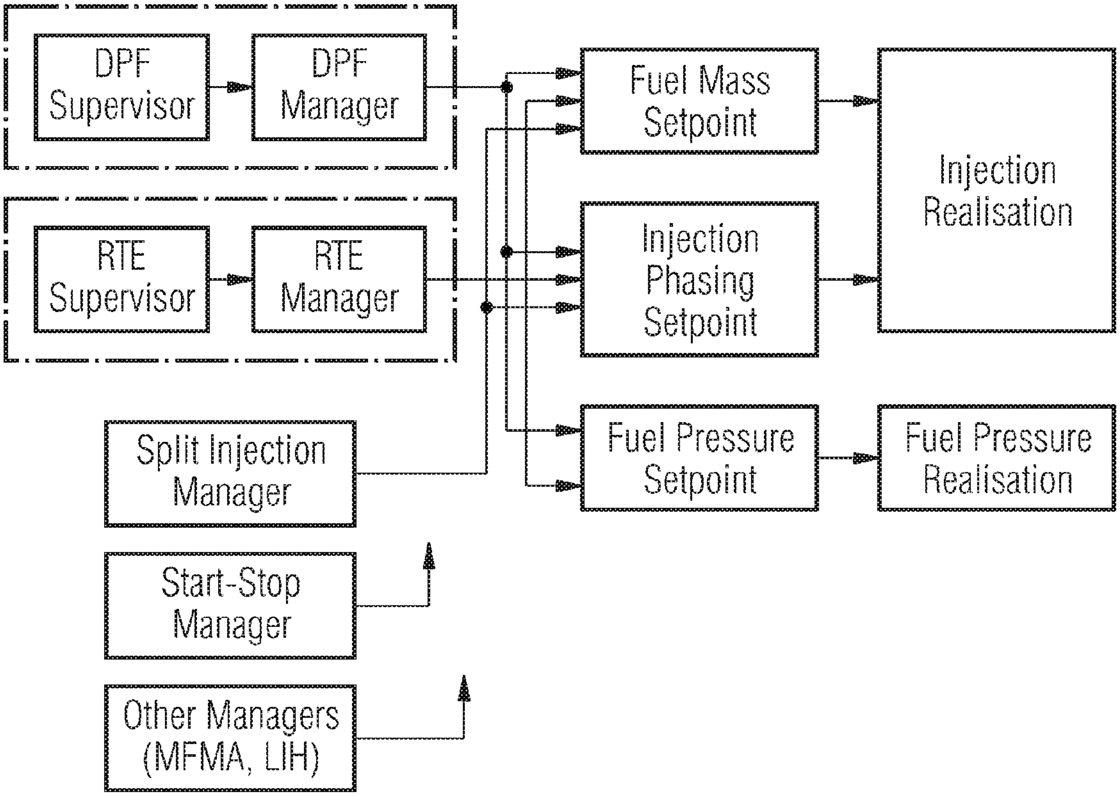
FIG 1 PRIOR ART
FIG. 1 illustrates an architecture overview of an engine management system with a decentralized structure according the prior art.
Figure 2:
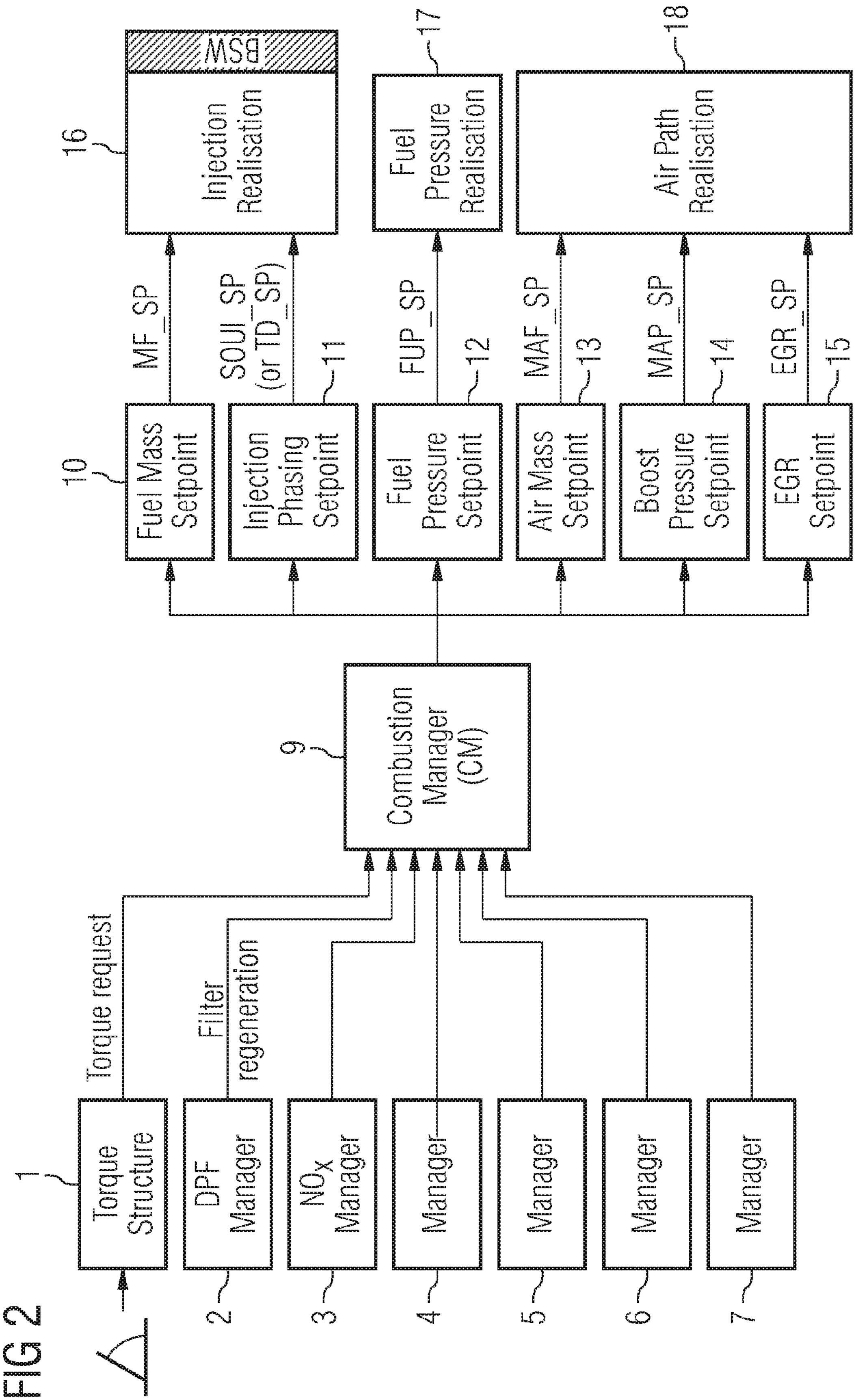
FIG. 2 illustrates an architecture overview of an engine system management system with a centralized manager according to a preferred embodiment.

FIG. 2 schematically illustrates the architecture of the combustion related strategies in a diesel common rail EMS. The main inputs of the combustion management strategy are torque request (manager 1) from the driver and the combustion modes requested from external managers 2 through 7. A mode manager is the software where the activation and request for each combustion modes are calculated. The main outputs of the combustion manager 9 are the individual combustion set points such as fuel mass setpoint 10, injection phasing setpoint 11, injection phasing setpoint 12, air mass setpoint 13, boost pressure setpoint 14, EGR setpoint 15 that are inputs to the strategies such as injection realization 16, fuel pressure realization 17 and air path realization controlling the actuators.

As an example: the DPF manager 2 decides the event when particle filter regeneration is necessary and then sends a request to the combustion manager 9 to initiate the DPF regeneration mode. The combustion manager 9 in turn will command the actuators to perform the DPF regeneration.

The nature and the number and of the external managers are dependent on the system components and the final Original Equipment Manufacturer (OEM). The general trend of the number of such external managers increases along with the emission legislation.

Depending on the external manager strategy, one or more combustion modes are assigned. In general a combustion mode can be understood as a specific combustion target (e.g. start the engine, heat up the DPF filter, regenerate the DPF filter, etc.). The combustion manager 9 is introduced as a central coordination strategy in the EMS. The strategy takes care of mode request prioritization and controls the transitions between combustion modes.

The combustion manager 9 acts as a bridge between the external managers 2 to 7 and the individual combustion set point strategies 10 to 15. Thus giving the flexibility to develop a generic combustion set point strategy that is independent of the external environment of the combustion management strategy.

The combustion manager 9 commands individual combustion set points for three independent systems within the engine:

the injectors 16 the rail pressure system actuators 17 the air path actuators 18

Each with a different reaction time. It is important to take such aspects into consideration for the coordination of the transition between combustion modes. For example a mode transition could trigger the transition of the set points for the slower system (air path actuators with the parameters MAP_SP: mass air pressure setpoint and MAF_SP: mass air flow setpoint) followed by the set point for the faster system (rail pressure system actuators with the parameter FUP_SP: fuel pressure setpoint) and finally the set points for the fastest system component (injectors with the parameters MF_SP: fuel mass setpoint and SOI_SP: start of injection set point).

Figure 4:
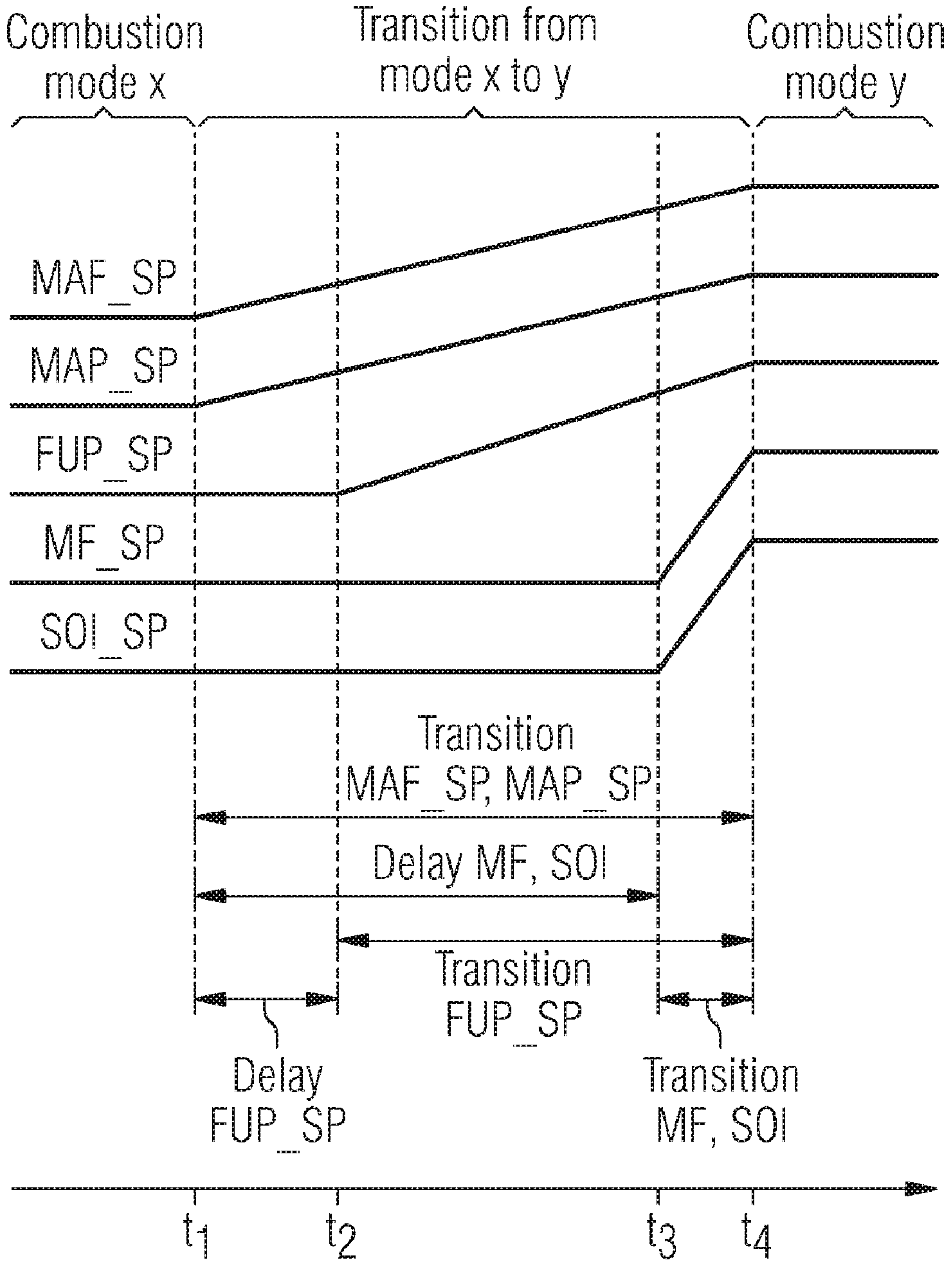
FIG. 4 shows time dependency of five engine parameters.

FIG. 4 illustrates a simplified example of the possible implementation of a transition from combustion mode x to combustion mode y. The transition factor T5 for mass air pressure MAP_SP and the transition factor T4 mass air flow MAF_SP are identical and result in this example to T4,5=$t_4-t_1$ wherein $t_1$ is the time when the transition starts and $t_4$ is the time when the transition ends. As can be seen from FIG. 4 the transition factors T4 and T5 are the longest followed by transition factor T3 of the fuel pressure FUP_SP defined as $t_4-t_2$. The shortest transition factor T1 for mass fuel MF and transition factor T2 for start of injection SOI are defined as $t_4-t_3$. With these transition factors it is possible to make a transition from one mode to another mode whereby each parameter reaches at the same the other combustion mode, here at time $t_4$.

Figure 5:
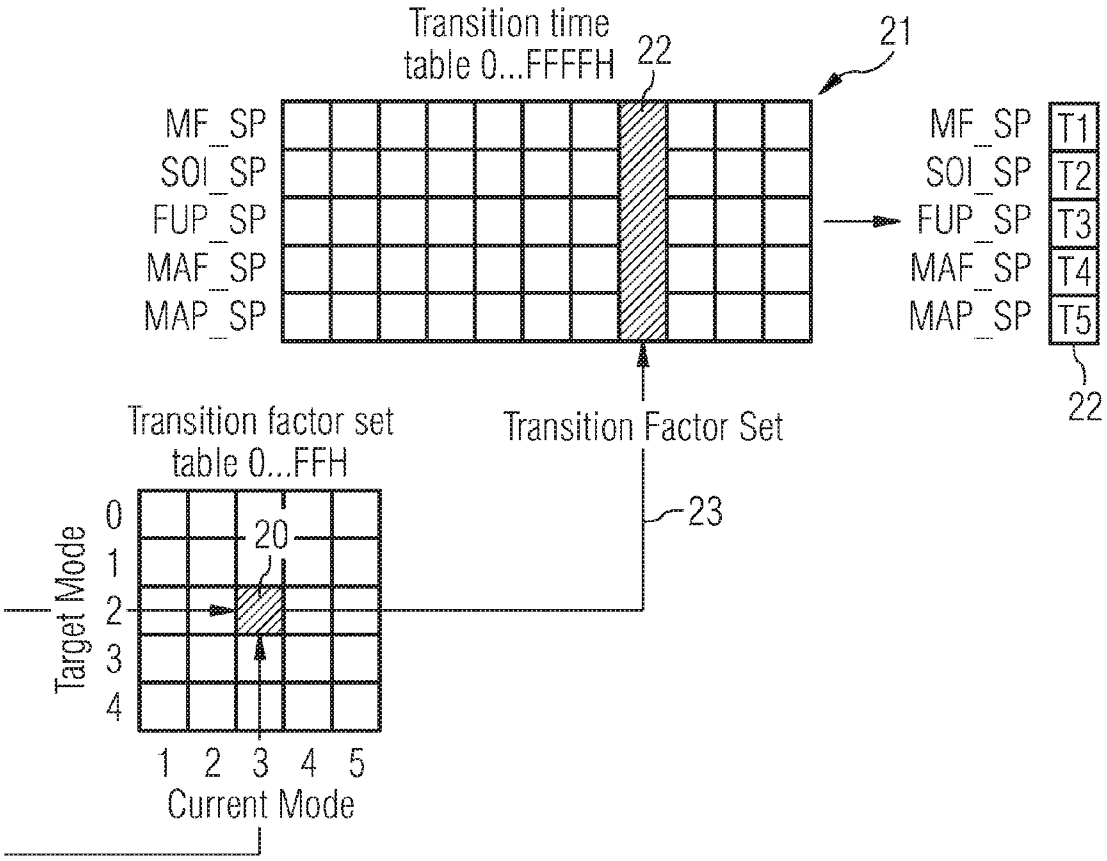
FIG. 5 shows a block diagram reading the transition factors in dependency of the transition.

It is possible to define transition times and/or delays for each combustion setpoint. Anyway it is not necessary to calibrate these times for each possible transition instead a limited set of times are defined and can be reuse as shown in FIG. 5. This figure shows in the left lower corner 5×5 array wherein the lines define the target mode and the columns define the current mode. According to the transition from one combustion mode to another combustion mode automatically the transition factor set is defined. Here in this example the engine is in the current mode 3 and a transition from this mode 3 to target mode 2 is requested. In the middle of this 5×5 array a black box 20 is marked. In this box 20 a pointer 23 is stored pointing to the transition factor set 22 (marked as black column) from a transition time table 21. A transition factor set 22 is for example the transition times T1 to T5 as shown on the right side of FIG. 5.

Figures 3A, 3B, 3C:
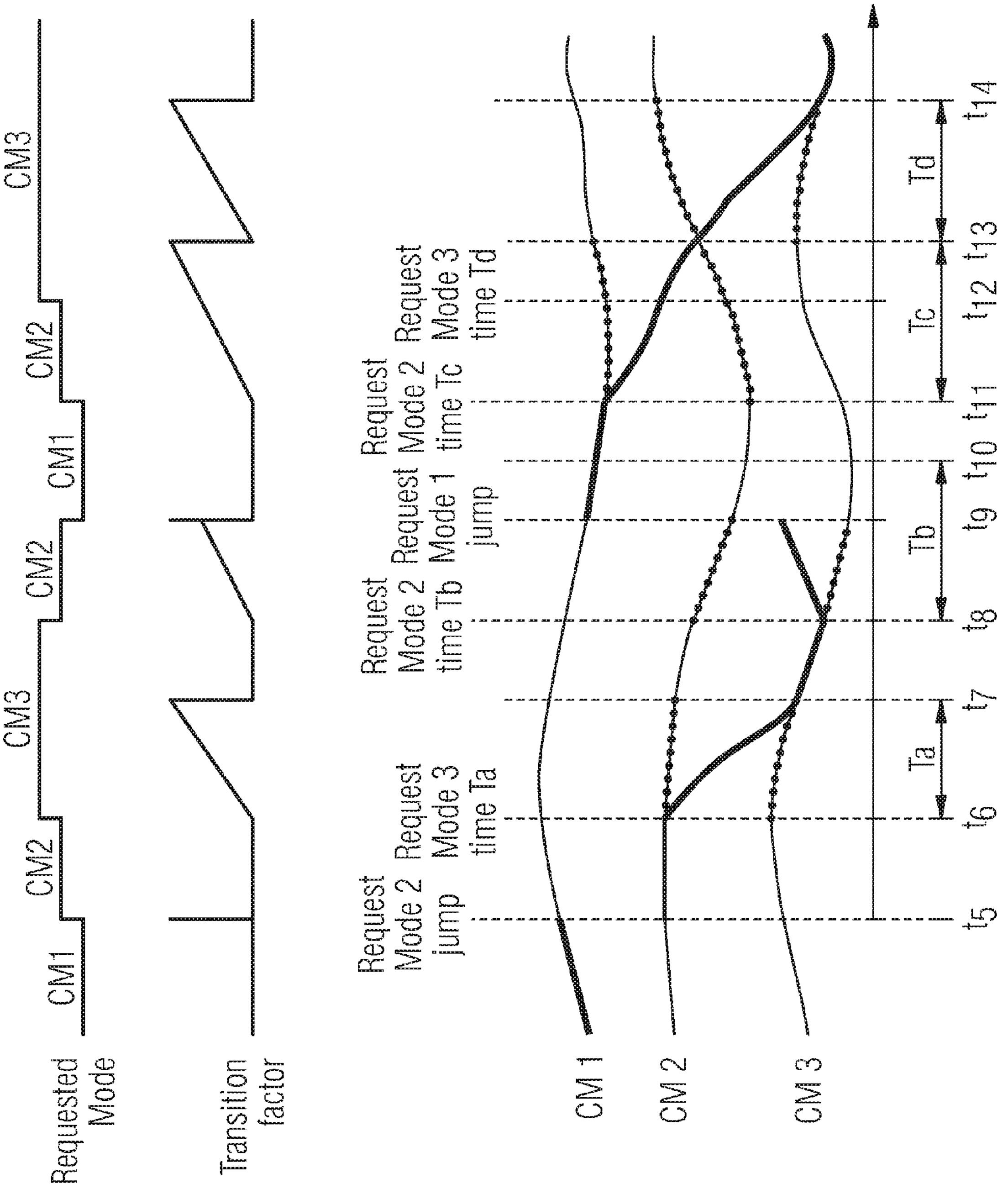
FIG. 3A shows the requests of a mode manager over the time.
FIG. 3B shows the corresponding transition factor over the time.
FIG. 3C shows three modes and the reaction of the request from FIG. 3A.

FIG. 3A shows requested modes from one or several managers 1 to 7 over the time. In FIG. 3B the corresponding transition factors are depicted thereby only showing the transition factor of one parameter, for example T4 of mass air flow. In FIG. 3C there different combustion modes CM1 to CM3 for one parameter are shown. At the beginning the engine runs in combustion mode CM1. At time $t_5$ a jump to combustion mode CM2 is requested. The system is reacts instantly. The parameter is set to CM 2 as shown in FIG. 3C. At time $t_6$ combustion mode CM3 is requested in the transition time $T_a$. Automatically the transition factor $T_a$ in FIG. 3B is set (shown as a ramp).

The normal case is shown between $t_{11}$ and $t_{14}$. At time $t_{11}$ combustion mode CM 2 is requested in the transition time $T_C$ (=$t_{13}-t_{11}$). During this transition from CM1 to CM2 at time $t_{12}$ another combustion mode CM3 is requested. As long as the transition from one mode to another mode is not terminated the new request is ignored. The transition from CM2 to CM3 only starts when the old transition has been terminated. This situation can be seen in time $t_{13}$ as the transition factor receives a new ramp.

In certain situation the above rule has to be broken for example if a zero torque or a sudden high torque is requested. In this case a jump over rules any prioritization of the combustion modes. This is shown between $t_8$ and $t_9$. At time $t_8$ a combustion mode CM2 in the transition time $T_b$ ($=t_{10}-t_8$) is requested. At time $t_9$ a jump to combustion mode CM1 is requested. Although the transition from CM3 to CM2 has not been regularly terminated at the time $t_{10}$. The jump request has already been performed thereby overruling the transition from CM3 to CM2.

It is annotated that a request from a current mode (e.g. CM1) to a target mode (e.g. CM2) could always be passed over neutral nominal mode NM. The request would then be translated as CM1-->NM-->CM2. This by-pass over the nominal mode has the big advantage that the number of predefined transitions are reduced and the adaptation of a generic project to a OEM-project is much simpler and thereby reducing time and money during development.

The known approach for calibration tables would be to define a calibration structure for each combustion set point in every combustion mode giving the advantage that the calibration structure could be adapted to the specific needs of the combustion mode. On the other side, wastage of the ECU resources would be seen, since the calibration tables can not be reused across the combustion modes. In addition, after tuning phase many calibration tables could stay unused. A deeper analysis shows that the basic dependencies like requested torque, engine speed and coolant temperature required for the calibration structures remain the same across combustion modes. This makes it possible to break the paradigm of a hard coded link between the calibration tables and a specific combustion set point in a specific combustion mode. By introducing a single scalable calibration structure, a flexible linking between the calibration tables, the combustion set points and the combustion modes solves the problem in a much more efficient way.

Figure 6:
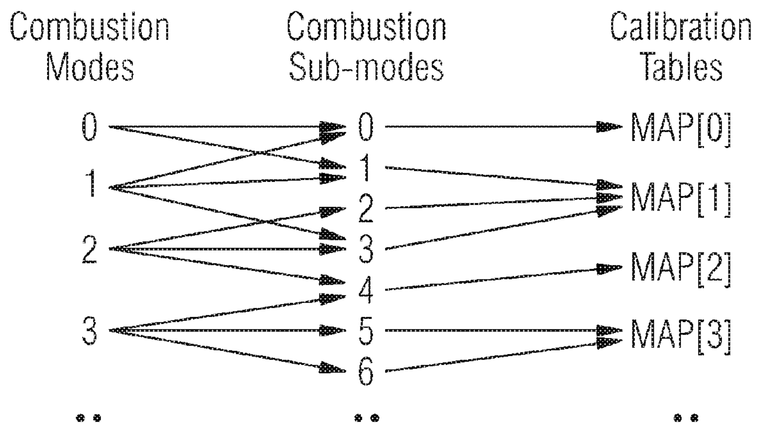
FIG. 6 illustrates calibration links between modes, submodes and calibration tables for one combustion set point.

FIG. 6 shows a schematic example of how the links between combustion modes, sub-modes and calibration tables could be established for a given combustion set point. Both layers of links can be freely chosen by the calibration team during tuning activities.

Figure 7:
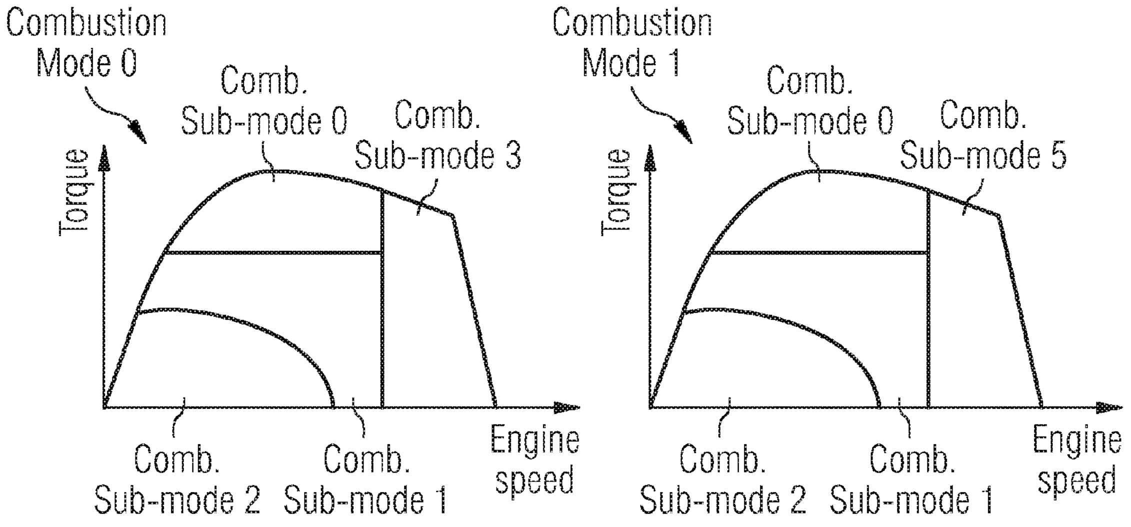
FIG. 7 shows two graph with different combustion mode wherein these two combustion modes only differ in one sub mode.

As shown in FIG. 6, reuse of calibration tables is possible at two different levels:

- In the first level two or more combustion modes can share areas where the calibration of all combustion set points is identical by sharing the same sub-modes. FIG. 7 illustrates an example where modes 0 and 1 share same calibration in most of the working area except for the region of high engine speed.
- In the second level two or more combustion sub-modes can reuse the same calibration table. In Figure this is the case for sub-modes 1, 2 and 3 as they are all linked to table MAP[1].

Figure 8A:
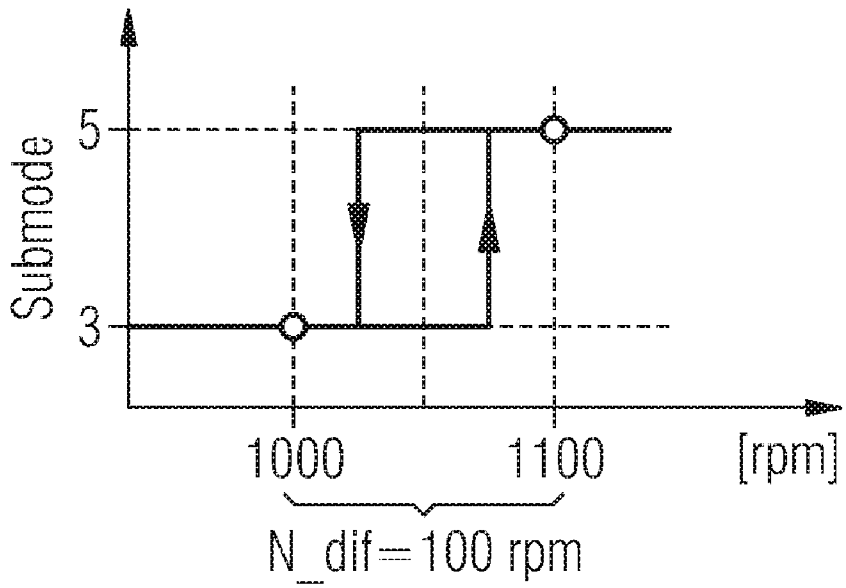
FIG. 8A illustrates a hysteresis curve over engine revolution.
Figure 8B:
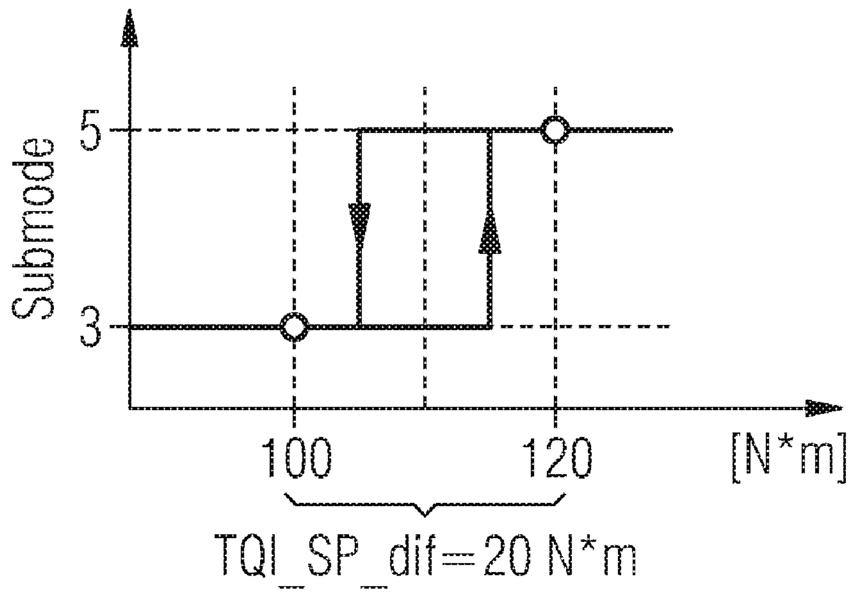
FIG. 8B illustrates a hysteresis curve over torque.

The combustion mode is converted into a combustion sub-mode. A combustion sub-mode can be understood as an injection profile (pattern of active injections). In order to avoid toggling a hysteresis is implemented as shown in FIG. 8A for engine revolution and in FIG. 8B for torque output. In order to improve the adaptability of the combustion management strategy to the needs of each project, the calibration tables are not defined as single elements but as arrays of several tables wherein number of elements as well as the dimensions of each array element can be configured.

Defining the calibration tables for a given combustion set point as one single array would have the disadvantage that they all share the dimension of the biggest required table and thereby wasting CPU resources.

In order to overcome this problem, several calibration table types are implemented for each combustion set point. For each table type, the dimensions can be configured separately. In case that one of the implemented table types is not required, the number of elements can be reduced to 1 and the element size to the minimum (2×2) so that the ROM consumption is negligible.

The increasing number of combustion modes in diesel common rail projects increases the optimization effort for the calibration engineers. At least the following combustion set points need to be tuned at each working point in order to reach emissions, noise and fuel consumption targets:

- Injection activation profile
- Fuel mass for each active injection
- Position of each active injection (Injection phasing)
- Rail pressure
- Air mass flow or Exhaust Gas Recirculation (EGR) rate
- Boost pressure Regardless of the calibration methods used to reach the optimization, the work of the calibration engineers is facilitated if the EMS shows the same software architecture for the calculation of each combustion set point.

Due to the increasing requirements set to an EMS, an optimized combustion management strategy has become essential. A strategy having as main features a centralized combustion management and a flexible calibration structure is considered to be a suitable solution for systems fulfilling current and future emission standards.

To summarize, the advantage of the centralized combustion management is that the strategy can be easily configured and adapted according to the needs either at the initial project phases or even at later stages of the project development. Indications from current implementations show that with a proper combustion strategy configuration and careful calibration strategy it is possible to reach the Euro 5 targets without significant increase in CPU resources consumption compared with Euro 4 systems.

What is claimed is:

1. A system for running an internal combustion engine comprising:

at least two mode managers for at least one of activating and requesting at least one combustion mode of the internal combustion engine, and a combustion manager wherein each of the output of the mode managers are attached at least at one input of the combustion manager for collecting and prioritizing all combustion mode requests active at the same time.

2. A system according to claim 1, wherein the combustion manager comprises a combustion mode transition manager for performing a transition from the current combustion mode to a target combustion mode.

3. A system according to claim 1, wherein the target combustion mode is dependent on the result of the prioritization of the active combustion mode requests.

4. A system according to claim 1, wherein the system further comprises means for activating the combustion mode transition manager in case the current and the target combustion modes are different.

5. A system according to claim 1, wherein the combustion manager comprises an interrupt unit for interrupting the running combustion mode transition manager in case a new combustion mode request has a higher priority than the target combustion mode and the combustion mode request is requesting a jump.

6. A system according to claim 5, wherein the combustion mode jump request is a zero torque request or a sudden high torque request.

7. A system according to claim 1, wherein the combustion mode transition manager comprises means for performing the transition from the current to the target combustion mode over a nominal mode.

8. A system according to claim 1, wherein the system uses a single scalable calibration structure, a flexible linking between the calibration tables, the combustion set points and the combustion modes.

9. A method for running an internal combustion engine comprising:

at least one of activating and requesting at least one combustion mode of the internal combustion engine by at least two mode managers, and collecting and prioritizing all combustion mode requests active at the same time by a combustion manager coupled with each of the output of the mode managers.

10. A method according to claim 9, further comprising the step of performing a transition from the current combustion mode to a target combustion mode by a combustion mode transition manager.

11. A method according to claim 9, wherein the target combustion mode is dependent on the result of the prioritization of the active combustion mode requests.

12. A method according to claim 9, further comprising the step of activating the combustion mode transition manager in case the current and the target combustion modes are different.

13. A method according to claim 9, further comprising the step of interrupting the running combustion mode transition manager in case a new combustion mode request has a higher priority than the target combustion mode and the combustion mode request is requesting a jump.

14. A method according to claim 13, wherein the combustion mode jump request is a zero torque request or a sudden high torque request.

15. A method according to claim 9, further comprising the step of performing the transition from the current to the target combustion mode over a nominal mode.

16. A method according to claim 9, wherein the method uses a single scalable calibration structure, a flexible linking between the calibration tables, the combustion set points and the combustion modes.

* * * * *